United States Patent [19]

Ladusaw

[11] 4,373,882
[45] Feb. 15, 1983

[54] DISCHARGE VALVE ASSEMBLY FOR COMPRESSOR

[75] Inventor: William T. Ladusaw, Louisville, Ky.

[73] Assignee: General Electric Company, Louisville, Ky.

[21] Appl. No.: 229,909

[22] Filed: Jan. 30, 1981

[51] Int. Cl.³ .................. F01C 21/00; F16K 15/16
[52] U.S. Cl. .................. 418/270; 137/856; 137/512.4
[58] Field of Search .............. 418/270; 137/855, 856, 137/857, 858, 512.4

[56] References Cited

U.S. PATENT DOCUMENTS

| 2,246,271 | 6/1941 | Davidson | 418/1 |
| 2,598,216 | 5/1952 | Bousky | 137/856 |
| 3,003,684 | 10/1961 | Tarleton | 417/372 |
| 3,031,861 | 5/1962 | McCormack | 62/196 |
| 3,568,712 | 3/1971 | Rinehart | 137/855 |
| 3,727,420 | 4/1973 | Kosfeld | 62/196 |
| 3,809,511 | 5/1974 | Linden et al. | 418/270 |
| 3,891,358 | 6/1975 | Ladusaw | 418/63 |
| 3,939,867 | 2/1976 | Lundvik et al. | 137/512.15 |
| 3,998,571 | 12/1976 | Falke | 137/855 |
| 4,088,428 | 5/1978 | Bannister et al. | 418/270 |
| 4,137,726 | 2/1979 | Watada | 62/196 C |
| 4,199,309 | 4/1980 | Connor | 137/856 |

Primary Examiner—Ira S. Lazarus
Attorney, Agent, or Firm—Frank P. Giacalone; Radford M. Reams

[57] ABSTRACT

A rotary compressor having a discharge check valve and a retainer assembly in which the valve is a reed type valve mounted on the retainer and the retainer having spaced locating projections for positioning the assembly in a valve chamber. The retainer has a projection dimensioned to engage between the retainer main body portion and one wall of the valve chamber to create a continuous radius free from flat spots for the valve to engage in its open position.

8 Claims, 6 Drawing Figures

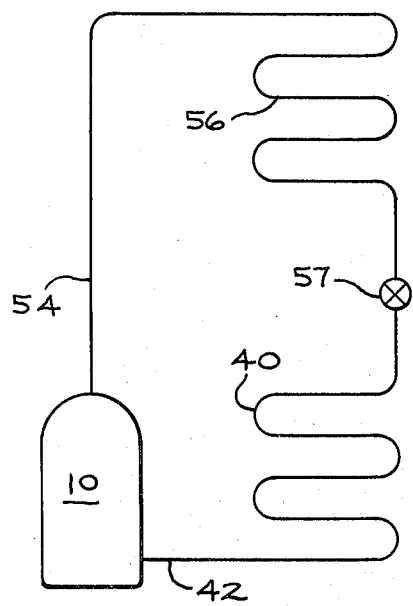
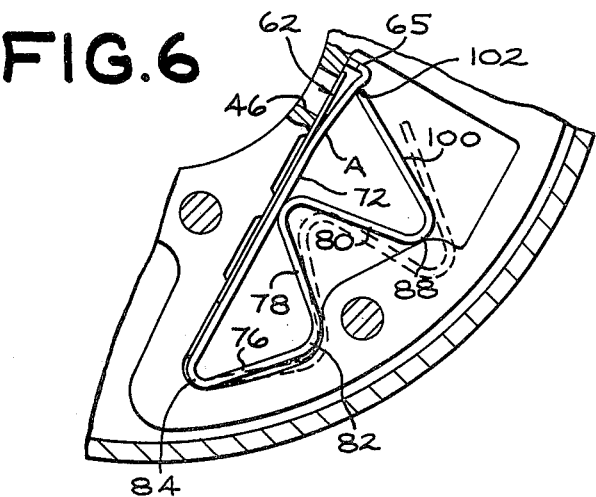
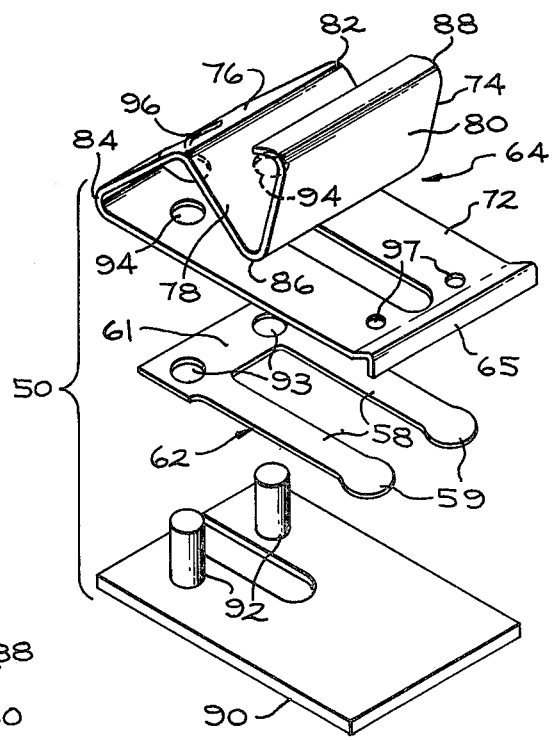
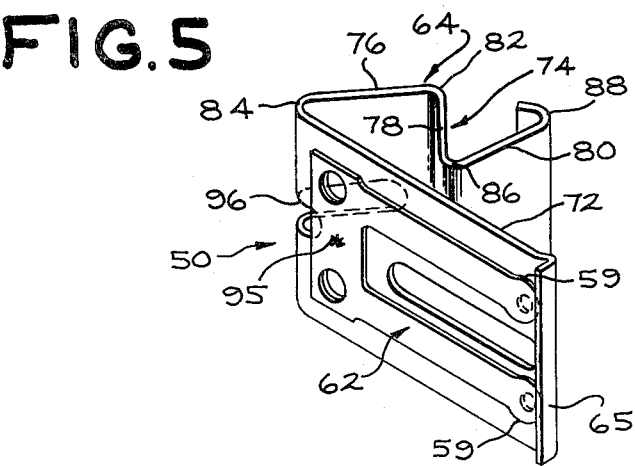

DISCHARGE VALVE ASSEMBLY FOR COMPRESSOR

BACKGROUND OF THE INVENTION

This invention relates to rotary compressors and particularly to an improved discharge check valve and retainer means assembly with positioning means securing the assembly in a valve chamber in a manner that creates a continuous radius backing surface for the valve.

In conventional rotary compressors, particularly of the type used in refrigeration systems, the compressor comprises a cylindrical wall member and end plates defining a compression chamber or cylinder, a rotor eccentrically mounted within the cylinder and a vane slidably mounted within the cylindrical wall for engagement with the periphery of the rotor to divide the chamber into a high pressure side and a lower pressure side. In operation of such a compressor, rotation of the rotor draws the gas into the low pressure side and discharges the compressed gas through a discharge port communicating with the high pressure side of the chamber on the opposite side of the vane from the lower pressure port. The high pressure gas passing through the discharge port enters a valve discharge chamber. Located in this valve discharge chamber is a check valve customarily of the reed type that is biased against the outlet opening to prevent back flow, but yieldable under gas pressure to permit the compressed gas to flow into the valve discharge chamber. Customarily, the valve is provided with a backing retainer that limits the movement of the valve in its open position. The radius of the valve retainer, against which the valve rests during the discharge period, is critical and any distortion or flatness of the retainer can cause discharge valve damage or breakage. Flatness, for example, can also cause the relatively thin reed valve to stick or remain in its open position and, accordingly, cause back flow of refrigerant gas. Valve sticking also causes the valve to more heavily strike against the seat causing valve breakage.

In some prior art discharge valves, such as those in 3,003,684-Tarleton, provide retainers that are ridged and formed to allow restricted movement of the valve. When this type construction is used, it requires great care in the forming operation to insure that a constant radius is formed free from distortion and flatness. In other prior art pertaining to discharge valve assemblies, such as those disclosed in U.S. Pat. Nos. 4,088,424-Bannister et al, and 4,137,726-Watada, valve and retainer assemblies are disclosed wherein the retainer is dimensioned to yieldably engage portions of a valve chamber to securely hold the assembly relative to the discharge port.

The present invention is directed to an improved check valve and retainer assembly wherein the retainer is dimensioned to yieldably engage portions of the valve chamber in a manner that creates a backing for the valve, and presents a continuous radius to the valve in its open position.

SUMMARY OF THE INVENTION

This invention relates to a rotary compressor including a central compressor body element including a cylindrical wall member and upper and lower end plate members defining an annular compression chamber for receiving a charge of refrigerant, and a high pressure discharge outlet from said compression chamber, and more particularly to a resilient discharge valve and retainer means assembly.

A valve discharge chamber is arranged in the central body element and extends between the upper and lower end plates. A valve seat on one wall of the valve discharge chamber communicates with the discharge outlet. A valve retainer in the valve discharge chamber is dimensioned to extend substantially between said end plate members and includes a base element dimensioned to cooperate with one wall of said discharge chamber. Formed on one end of said base element is a spacing element that maintains a space between the base element and the discharge outlet in the area of said valve seat. An arm portion extends from the other end of the base portion and includes a first point contacting another wall of the discharge chamber and a second point contacting the base element to create a fulcrum point intermediate the ends of the base element. This configuration secures the retainer in the chamber with the base element against the one wall at the second point so that a constant radius is formed in the retainer between the fulcrum point and the spacing element.

The resilient valve member is mounted on the retainer and positioned between its base portion and the high pressure outlet and is biased against the outlet to overlay the outlet. The valve is movable between its closed position over the outlet valve seat and an open position forming a constant radius against the valve retaining portion.

BRIEF DESCRIPTION OF THE DRAWINGS

FIG. 3 is a schematic view of a refrigerator system including the compressor of the present invention;

FIG. 4 is an exploded perspective of the valve and retainer prior to assembly;

FIG. 5 is a perspective view showing the valve and retainer assembly, and

FIG. 6 is a fragmentary plan view similar to FIG. 2 showing another embodiment of the valve and retainer assembly arranged in the compressor.

DESCRIPTION OF THE PREFERRED EMBODIMENT

Figure 1:
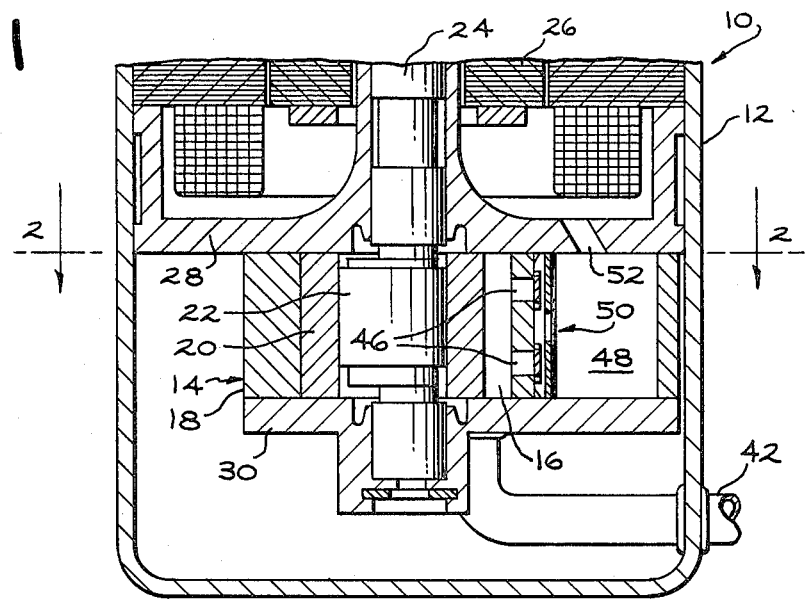
FIG. 1 is a side elevational view partially in cross-section of a hermetic refrigerator compressor incorporating the present invention.

Referring to FIG. 1, there is shown a hermetic compressor 10 including a hermetic casing 12 in which there is disposed a refrigerant compressor unit 14 having an angular chamber or compressor chamber 16 defined within a cylinder or housing 18. Disposed for rotation within the chamber 16 is a rotor 20 which is driven by an eccentric 22 formed as an integral part of the drive shaft 24 extending downwardly from the motor 26. A bearing formed in the supporting main frame 28, supports the shaft 24 above the eccentric 22 for rotation by the motor 26. It should be noted that the upper end wall enclosing the angular compressor chamber 16 is provided by the main frame 28. The main frame 28 also supports the compressor unit 14 within the hermetic casing 12. The opposite or lower end wall 30 of the compressor chamber 16 also supports the lower end of the shaft 24. The chamber 16 extends between the walls 28 and 30.

Figure 2:
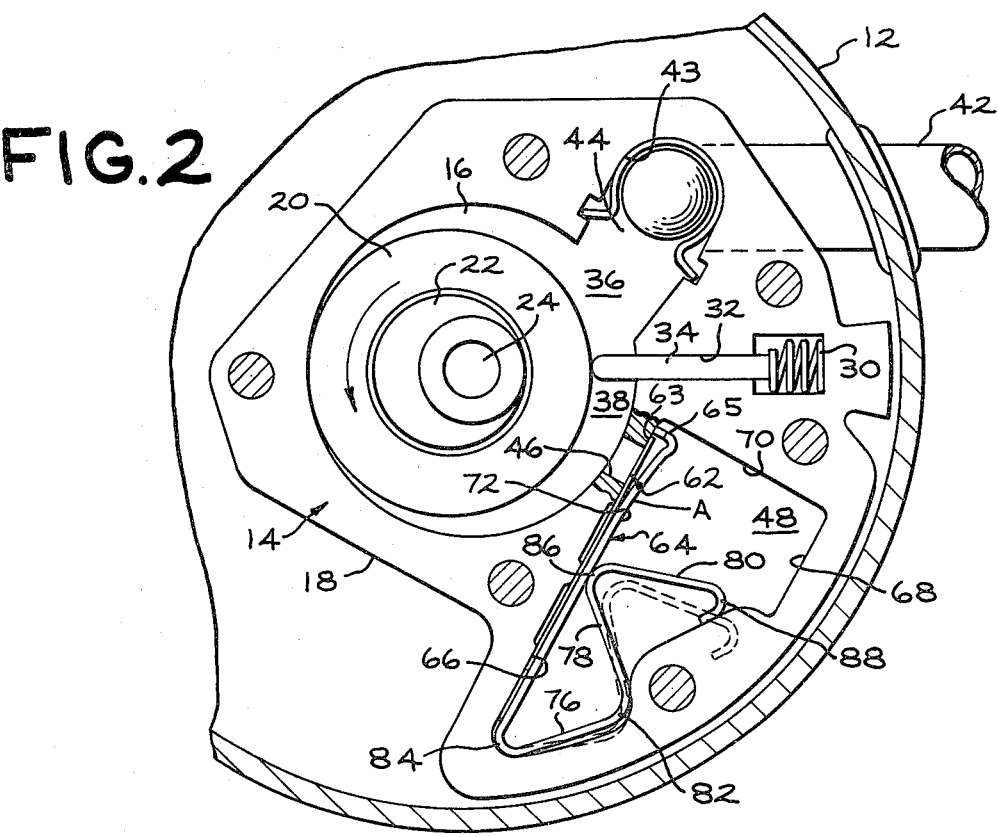
FIG. 2 is a partial plan view taken along line 2—2 of FIG. 1; showing the valve and retainer assembly of the present invention arranged in the compressor.

As may best be seen in FIG. 2, the cylinder 18 is provided with a radial slot 32 having slidably disposed therein a blade or vane 34 which is biased into engagement with the peripheral surface of the rotor 20 by a spring 30 thereby dividing the chamber 16 into a low and high pressure side respectively designated as 36 and 38.

As may be seen in FIG. 3, the hermetic compressor 10 is adapted to be connected into a refrigeration system to receive suction gas from an evaporator 40 through a suction line 42. Means are provided for delivering the suction gas into the low pressure side 36 of the chamber 16 from the suction line 42. Typically, referring to FIG. 2, these means may include chamber or channel 43 having an inlet area 44 formed in the cylinder 18 and communicating with the compressor chamber 16. The inlet area 44 delivers low pressure gas into the low pressure side of 36 of the compression chamber 16 where it is compressed between the peripheral surface of the rotor 20, the sides of the angular chamber 16, and the high pressure side 38 of the vane 34, during rotation of the rotor 20 around the chamber.

Means, including a discharge port 46 communicating with a discharge valve chamber 48, are provided for discharging the high pressure gas from the high pressure side 38 of the angular chamber 16 into the hermetic casing 12. Mounted within the discharge chamber 48 is the high pressure discharge valve assembly 50 of the present invention for assuring proper compression of the gas issuing through the discharge port 46 and preventing reverse flow of gas back into the compression chamber 16. As may be seen in FIG. 1, the high pressure gas from the discharge chamber 48 flows into the hermetic casing 12 through a passage 52 formed in the main frame 28. After flowing upwardly over the motor 26, the high pressure gas is conducted out of the hermetic casing 12 through a suitable discharge means or outlet in the upper end of the case. The gas then flows through a discharge line 54 shown only in FIG. 3 into the condenser 56 where the heat absorbed by the refrigerant in the other portions of the system is abstracted. As the gas in the condenser 56 is cooled, it condenses so that the refrigerant in the latter stage of the condenser is therefore largely in liquid form. This refrigerant, in liquid form, then travels through the expansion means 57, evaporator 40 and back to the compressor.

The present invention is directed to the provision of an improved discharge valve and retainer means assembly that is adapted to be arranged in the compressor discharge valve chamber with the valve overlying the discharge port, while at the same time providing a valve backing portion that restricts the valve to conform to a continuous radius when in its open position.

To this end, referring to FIGS. 2, 4 and 5, the valve retainer assembly 50, which is arranged in the chamber 48 in a manner to be fully explained hereinafter, includes the retainer 64 and discharge valve 62. In carrying out the present invention steel having a thickness of 0.010 inches was used in fabricating the valve 62, and steel having a thickness of 0.026 was used in fabricating the retainer 64. It should be noted that the thickness of the material may vary depending on the type of material used, the size of the compressor and other variables. In the compressor, employed in reducing to practice the present valve assembly, the discharge chamber 48 is formed in the housing 18 and extends between plates 28 and 30. It should be noted that the exact size, location and configuration of the discharge chamber is not critical in carrying out the present invention, however, it is critical that the valve assembly be dimensioned to coincide with that of the particular discharge chamber it is used in. The chamber 48 in the presently disclosed embodiment is defined by wall means including a relatively flat first wall 66, an opposite second wall 68 extending from wall 66 and following substantially the curvature of the casing 12 in which the cylinder is mounted, and a connecting wall 70 extending between walls 66 and 68. The discharge port 46 is provided with a valve seat 63 which is positioned on wall 66 toward wall 70.

The retainer 64 generally includes a relatively flat base portion or element 72 and a convoluted holding portion 74 that interacts with the wall 68 of chamber 48 and base element 72 to secure retainer 64 in its effective position as taught by the present invention. The valve is secured to the retainer base portion in a manner to be explained fully so as to be biased outwardly against the wall 66 and properly aligned to cover or overlie the discharge port 46. The retainer is dimensioned to extend between the end walls 28 and 30 for positioning the retainer and thus the valve 62 in proper relationship to the high pressure outlet port 46. The retainer when not deformed (FIGS. 4 and 5 and dotted line position FIG. 2) has a dimension between base 72 and portion 74 that is greater than that of the discharge chamber 48 as shown in FIG. 2.

The base element 72 is dimensioned to extend along the wall 66 and has extending from its free end adjacent wall 70, a spacing extension or tab 65. The tab 65 effectively spaces the portion of base element 72 overlying seat 63 away therefrom to permit proper functioning of valve 62 and, as will be explained, also allows the retainer portion 72 to assume its effective valve backing configuration.

The convoluted holding portion 74 of retainer 64 is formed to include three segments 76, 78 and 80 having dimensions that interact between base element 72 and wall 68 to secure the valve and retainer assembly 50 between walls 66 and 68 of chamber 48. The first segment 76 extends from end 84 of base 72. The second segment 78 is bent back from segment 76 toward base 72 forming a first contact point 82 at the intersection of segments 76 and 78 that is adapted to engage wall 68. The third segment 80 is bent back from segment 78 toward wall 68 forming a second contact point 86 adapted to engage base 72 at a point intermediate the end 84 and tab 65 with the free end of segment 80 forming a third contact point 88 adapted to contact the wall 68 intermediate contact point 82 and wall 70.

The dimension of segments 76, 78 and 80 are such that with the assembly 50 in its installed or deformed position in chamber 48 the contact points 82 and 88 are in firm engagement with the wall 68 with contact point 86 and end 84 reacting against base portion 72 in the following manner. The interaction between points 82 and 88 with wall 68 forces point 86 and the end 84 to hold the section of element 72 between point 86 and end 84 in intimate contact with wall 66. As seen in FIG. 2 with the tab 65 maintaining the free end of base 72 away from wall 66 a constant radius is formed in the section A of base 72 between contact point 86 and tab 65. In effect with tab 65 maintaining the portion of base 72 away from valve seat 63, point 86 becomes the fulcrum as base 72 bends or deforms into a continuous radius free from flat spots that may cause valve damage. The valve 62 in its open position is forced against the retainer and follows the continuous radius for full surface support.

In the present embodiment two discharge ports 46 are provided and accordingly a valve element is provided for each port. To this end the valve 62 is generally U-shaped including a central portion 61 and substantially parallel extending valve members 58. Each valve member being formed with a valve covering portion 59 at the end thereof. Regardless of the number of discharge ports, means are provided to insure that the valve and more particularly the valve covering portion 59 overlies its cooperating valve seat 63 of discharge port 46. To this end a fixture 90 is provided that includes two locating projections or pins 92. The valve 62 is provided with openings 93 in the central portion 61 which are dimensioned to be placed over the pins 92 on fixture 90. The retainer 64 is provided with openings 94 which are also dimensioned to be placed over the pins 92. With the valve 62 and retainer 64 in position on the fixture 90 they are then spot welded as indicated at 95 in FIG. 5. To facilitate the welding operation and to provide access to the area to be welded a portion of base 72 adjacent end 84 and a portion of segment 76 are provided with a cut out or opening 96 that allows insertion of a welding member (not shown). Also provided in fixture 90 is a like opening which allows the other welding fixture electrode to be in intimate contact with valve 62, thus insuring intimate weld 95 between 62 and 64. Since the retainer 64 is dimensioned to be properly located in chamber 48 the accurate location of valve 62 on retainer 64 insures proper location of valve 62 and more particularly portion 59 relative to valve seat 63.

As mentioned above the valve 62 in its open position is forced against the retainer 64 by the pressure of the discharge gas and is biased to return to its position over valve seat 63. The amount of time a valve in this type compressor remains open is critical. The surface tension of oil between the engaging valve surface and that of the retainer may be sufficient in some instances to cause the valve to remain open long enough to cause back flow into the compressor chamber 16. To this end, apertures 97 are positioned in retainer portion 72 to align substantially with valve cover portions 59. It has been found that in the present instance when apertures having an approximate diameter of 0.200 inches have been used, the surface tension has been reduced to an acceptable level.

Referring now to FIG. 6 there is shown another embodiment of the valve retainer assembly wherein like parts are represented by the same reference numerals employed in the embodiment shown in FIGS. 1-5. Under severe abnormally high pressure conditions the section A of the base portion may move outwardly with the possibility that the constant radius configuration may be distorted. To this end a forth segment 100 extending from the contact point 88 with its free end 102 positioned adjacent a portion of segment A in the general area of port 46 and tab 65. With this arrangement excessive movement of the base 72 will be aborted by contact with the free end 102 and that force supported by segment 100 in intimate contact with wall 68 at point 88.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

I claim:

1. In a rotary compressor, a central compressor body element including a cylindrical wall member and upper and lower end plate members defining an annular compression chamber for receiving a charge of refrigerant, a high pressure discharge port from said compression chamber, a discharge valve and retainer means assembly comprising:

wall means defining a valve discharge chamber in said central body element extending between said upper and lower end plates, a valve seat on one wall of said valve discharge chamber communicating with said discharge outlet;

a valve retainer in said valve discharge chamber including a base element dimensioned to cooperate with said one wall of said discharge chamber, a spacing element on one end of said base element dimensioned to space said base element from said valve seat, holding means extending from said base element including a first point contacting another wall of said discharge chamber and a second point contacting said base element at a fulcrum intermediate the ends of said base element to secure said retainer in said chamber with said base portion deflected between said fulcrum and said spacing element to form a constant radius therebetween, a resilient valve member mounted on the base element of said retainer between the base element and said valve seat being biased against said valve seat to overlay said valve seat with said valve being movable between its closed position over said valve seat to an open position forming a constant radius against said base element of said valve retainer.

2. The compressor of claim 1 wherein said valve retainer is dimensioned to extend between said upper and lower end plates for aligning said valve member relative to said valve seat.

3. The compressor of claim 2 wherein at least two high pressure discharge ports are provided between said compression chamber and said valve discharge chamber, and said valve includes a central portion and valve members extending therefrom being adapted to cooperate with each discharge port.

4. The compressor of claim 3 wherein said valve retainer holding means includes a third point being positioned to be engaged by said base element if said base element moves away from said one wall of said valve discharge chamber.

5. In a rotary compressor, a central compressor body element including a cylindrical wall member and upper and lower end plate members defining an annular compression chamber for receiving a charge of refrigerant, a high pressure discharge port from said compression chamber, a discharge valve and retainer means assembly comprising:

wall means defining a valve discharge chamber in said central body element extending between said upper and lower end plates, a valve seat on one wall of said valve discharge chamber communicating with said discharge outlet;

a valve retainer in said valve discharge chamber dimensioned to extend substantially between said end plates, said valve retainer including a base element dimensioned to cooperate with said one wall of said discharge chamber, a spacing element on one end of said base element dimensioned to space said base element from said valve seat, holding means extending from the other end of said base element including a first point contacting another wall of said discharge chamber and a second point contacting said base element at a second point intermediate the ends of said base portion to secure said retainer in said chamber with said base element against said one wall at said second point so that a constant radius is formed in said base element between said second point and said spacing element at the one end of said base element;

a resilient valve member mounted on the base element of said retainer between the base element and said valve seat being biased against said valve seat to overlay said valve seat with said valve being movable between its closed position over said valve seat to an open position forming a constant radius against said base element of said valve retainer.

6. The compressor of claim 5 wherein said valve retainer is dimensioned to extend between said upper and lower end plates for aligning said valve member relative to said valve seat.

7. The compressor of claim 6 wherein at least two high pressure discharge ports are provided between said compression chamber and said valve discharge chamber, and said valve includes a central portion and valve members extending therefrom being adapted to cooperate with each discharge port.

8. The compressor of claim 7 wherein said valve retainer holding means includes a third point being positioned to be engaged by said base element if said base element moves away from said one wall of said valve discharge chamber.

* * * * *